April 3, 1945.  E. H. LAND  2,373,035
LIGHT POLARIZING IMAGE AND PROCESS OF MANUFACTURE
Filed May 27, 1939
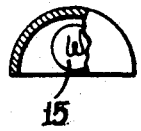
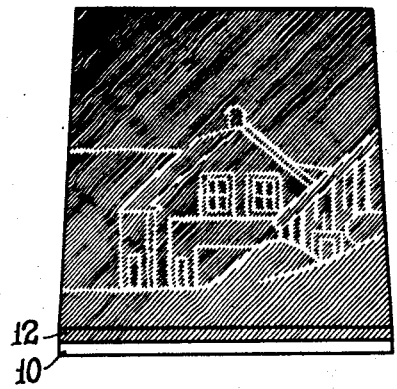
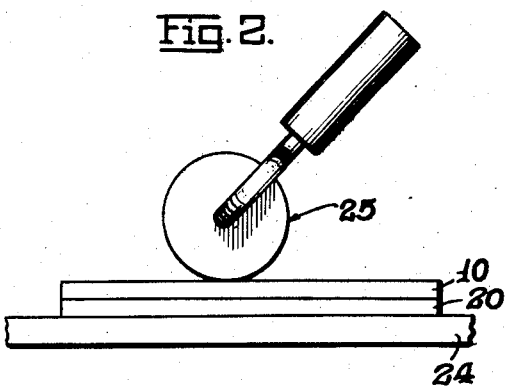
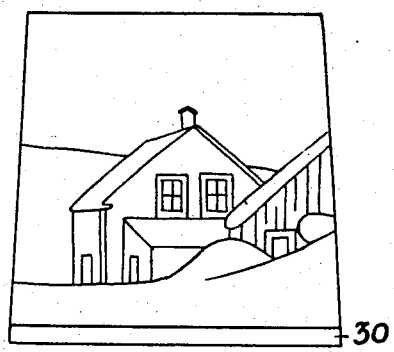
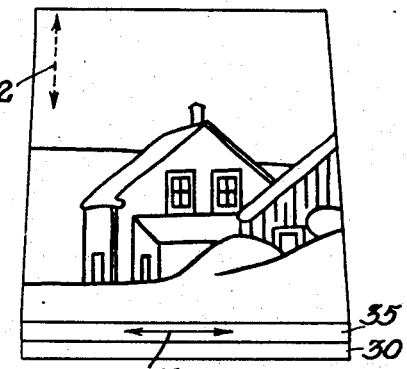
INVENTOR:
EDWIN H. LAND,
BY Brown & Jones
ATTORNEYS Patented Apr. 3, 1945

2,373,035

UNITED STATES PATENT OFFICE 2,373,035

LIGHT POLARIZING IMAGE AND PROCESS OF MANUFACTURE

Edwin H. Land, Boston, Mass., assignor to Polaroid Corporation, Dover, Del., a corporation of Delaware Application May 27, 1939, Serial No. 276,233

19 Claims. (Cl. 88—65)

This invention relates to a process for forming, in material from the class consisting of the light-transmitting plastics having oriented, chain-like molecules, a design most clearly visible in polarized light, and to the product of said process.

An object of the invention is to provide a process for the formation, in a sheet or film of a light-transmitting plastic material, such for example as polyvinyl alcohol, regenerated cellulose or polyvinyl acetyl, of a design the optical density of which is a function of the direction of vibration of light incident thereon.

Other objects of the invention are to provide processes of the character described wherein the sheet is prepared for the formation therein of the design by substantially orienting the molecules of the sheet; wherein the prepared sheet is treated by staining or dyeing to form the design therein; wherein the said sheet is stained by printing thereon from a gelatin relief, a half-tone plate or the like with a dye or stain; wherein iodine is employed to dye or stain said sheet; and wherein the dye or stain is applied to said sheet so that predetermined areas thereof show a predetermined optical density when viewed in polarized light, and other areas thereof show different predetermined optical densities when so viewed, the composite of said areas forming a predetermined design.

Other objects of the invention are to provide, as a new article of manufacture, an image-carrying sheet or film comprising a light-transmitting plastic having oriented, chain molecules; to provide such a sheet or film which has been stained or dyed so as to show a predetermined image the optical density of which is a function of the direction of vibration of light incident thereon; to provide an image rendered in percentage polarization; to provide such a sheet of polyvinyl alcohol; to provide such a sheet dyed with iodine or a compound of iodine, and to provide such a sheet in which the image is produced from a gelatin relief or from a half-tone plate or the like.

Other objects of the invention will in part be obvious and will in part appear hereinafter.

The invention accordingly comprises the several steps and the relation of one or more of such steps with respect to each of the others, and the article possessing the features, properties, and the relation of elements which are exemplified in the following detailed disclosure, and the scope of the application of which will be indicated in the claims.

In the drawing:

Figure 1 is a somewhat diagrammatic view illustrating the step of exposing sensitive wash-off gelatin relief paper to light through a photographic negative of which it is desired to form a positive light-polarizing reproduction;

Fig. 2 is a diagrammatic view representing a convenient way of handling the various elements during the transfer of the desired image from a wash-off relief prepared from the negative shown in Fig. 1 to the plastic sheet on which the light-polarizing image is to appear;

Fig. 3 is a diagrammatic view in perspective illustrating the light-polarizing image prepared in accordance with the invention, as it appears when viewed without an analyzer; and Fig. 4 is a similar view showing the same print as it appears when viewed with a suitable analyzer having its transmission axis at right angles to the transmission axis of said print.

In the practice of the present invention, a polarizing design is formed in previously non-polarizing transparent plastic material by directly dyeing or staining the said material in the form of the design after it has been suitably prepared. The predetermined image or design formed in the material shows differing optical densities or different degrees of contrast between the light and dark areas thereof in polarized light, said differing optical densities of the design being a function of the vibration direction of light incident thereon.

In the practice of the present invention, a sheet or film of a light-transmitting, preferably transparent plastic, having chain molecules which have been substantially oriented, is preferably employed. Such a film may comprise any of a variety of plastic materials, such for example as regenerated cellulose, or vinyl compounds, such for example as incomplete polymerized polyvinyl acetal, or preferably polyvinyl alcohol. Orientation of the long molecules of the sheet or film may have been effected by subjecting the sheet to an extension or stretch while heated or otherwise softened. Polyvinyl alcohol, for example, may be suitably stretched or extended after it has been heated, while regenerated cellulose may be similarly suitably extended or stretched after it has been subjected to a swelling agent.

A preferred material for use in connection with the present invention as a sheet or film to be treated is accordingly a transparent plastic having long chain molecules which are oriented to substantial parallelism, and more specifically a sheet of polyvinyl alcohol so prepared.

It is to be understood that the degree of orientation of the molecules of the plastic sheet or film is subject to variation in the practice of the present invention. Where the product of the present invention is to be employed as one of a pair of stereoscopic images it is desirable that the orientation of the molecules within the plastic sheet be substantially complete. Where the product of the present invention is to be otherwise employed, for example in advertising displays, as an image to be viewed in polarized light, such high degree of orientation is not essential. As the orientation of the molecules departs from substantial parallelism, the image formed in the sheet becomes more and more visible in polarized light vibrating substantially at right angles to the direction of vibration of light in which the image shows the most contrast.

In my copending application Serial No. 237,783, filed October 29, 1938, for light polarizer and process of manufacture, there are described methods of forming polarizing sheets or films of materials such as those described, as by dyeing or staining the said sheets or films. In the practice of the present invention, images, designs, indicia and the like which are visible in polarized light may be formed in the sheets or films by applying to them, over predetermined areas, suitable dyes or stains, so that predetermined areas of the sheets or films are rendered predeterminedly polarizing, the sizes and positions of the areas and the quantities of dye or stain applied thereto being predeterminedly controlled so that the areas form in polarized light a design which is an exact reproduction of the image, design, or indicium which it is intended to reproduce. This may be accomplished in various ways.

A preferred method is to prepare in the usual manner a wash-off gelatin relief of the design or image which it is intended to reproduce. This relief is then wetted with the dye or stain to be employed, the excess is removed, the relief is applied to the surface of the sheet or film to be dyed or stained, and pressed thereagainst, for example by means of a roller press, and then removed.

In the drawing, Fig. 1 shows a wash-off relief 10 being exposed to a light source 15 through a photographic negative 12. Fig. 2 shows relief 10, which has been dyed or stained, being applied to the surface of a sheet of oriented plastic 20 and pressed thereagainst by a roller 25. A suitable support 24 is provided. Fig. 3 shows a plastic sheet 30 bearing the image transferred thereto during the step shown in Fig. 2 and indicating the appearance of the image when viewed without an anlyzer. Fig. 4 represents the image shown in Fig. 3 as it appears when viewed through an analyzer 35 having its axis 34 crossed with axis 32 of sheet 30.

A preferred dye or stain is one comprising iodine in combination with an iodide which forms with the iodine a polarizing polyiodide. Suitable iodides for use in the preparation of such a stain are, for example, sodium iodide and ammonium iodide. They are preferably employed with a relatively small amount of iodide. A suitable solution, for example, for staining polyvinyl alcohol, may be formed by preparing a solution of 20 grams of ammonium iodide in 100 c. c. of water, dissolving therein one gram of iodine, and adding thereto a solution of 50 grams of ammonium iodide in 500 c. c. of water. Other quantities of the iodide may be used. By altering the quantity of the iodide employed, predetermined changes in the extinction color of the image formed may be obtained. Stains produced from solutions of iodine and iodides are herein described as stains formed by polarizing polyiodides.

It is to be understood that many other dyes or stains may be used, for example, the dyes mentioned in my said copending application Serial No. 237,783. Speaking generally, most aniline dyes may be employed. Bromine also may be used in the process of the invention.

Most of the dyes, and specifically the preferred iodine-iodide solutions, result in the formation of polarizing areas which absorb light vibrating in a direction parallel to the direction of orientation of the elongated molecules of the plastic sheet. Others of the dyes result in the formation of polarizing areas which absorb vibrations perpendicular to the direction of orientation of the elongated molecules of the plastic sheet. By selecting suitable dyes or stains, it is possible to form stereoscopic prints, the left-eye image or print being formed, for example, in a dye or stain which renders the molecules absorbing to light vibrating in a predetermined direction, and the right-eye image being formed in a dye or stain which renders the molecules absorbing to light vibrating in a direction at right angles to the first direction of vibration. A suitable stereoscopic print may be formed by first printing one eye image upon the sheet in one type of dye and then superimposing the other eye image on the sheet in the other type of dye.

The process of the present invention is admirably adapted for the production of stereoscopic prints, for example where the sheet carrying the polarizing design is backed by an opaque reflecting surface, such for example as a metalized paper or the like. It is equally adapted to the production of stereoscopic film or transparencies, and more particularly to the production of such stereoscopic film for use in connection with motion picture projection.

In one form of the invention, one image may be formed on one face of the film and the other image on the other face thereof, or both images may be superimposed on the same face of the film. So also composite films may be formed in which the direction of orientation of the chain molecules of the sheet adjacent one surface is substantially at right angles to the direction of orientation of the molecules adjacent the opposite surface of the composite sheet. With such a structure the same dye may be employed in forming a left-eye image on one surface and a right-eye image on the other surface of the sheet. All such modifications are to be deemed within the scope of the invention.

It will be understood that the image, indicium or design formed in the plastic sheet may be produced by means other than the use of a gelatine relief. Any means may be employed. Half-tone plates, for example, may be used, or the design may be formed by painting or writing with the suitable dye or stain. All such methods are to be deemed to fall within the scope of my invention.

Under certain circumstances, and for example where polyvinyl alcohol is employed, the sheet or film in which the design is formed may be somewhat further polymerized after its molecules have been substantially oriented and before the image is formed therein. This may be accomplished by heating the sheet after it has been stretched and while maintaining it in stretched condition. A sheet so treated shows less water permeability and greater heat stability than an untreated sheet.

It is further to be understood that in the formation of the polarizing design the use of different stains or dyes, or different concentrations of the same stain or dye, may result in the production of polarizing images showing different extinction colors and varying degrees of contrast, even though the images be produced from the same plate relief or other means. All such modifications of the process are to be deemed within the scope of the invention.

Since certain changes in carrying out the above process, and certain modifications in the article which embody the invention may be made without departing from its scope, it is intended that all matter contained in the above description or shown in the accompanying drawing shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

Having described my invention, what I claim as new and desire to secure by Letters Patent is:

1. The process comprising forming a sheet of a transparent plastic having long, substantially oriented chain molecules and converting predetermined portions of said sheet to dichroic light-polarizing areas, said areas forming in said sheet a predetermined image, the optical density of each of said areas being a function of the vibration direction of light incident thereon.

2. The process comprising forming a sheet of a transparent plastic having long, substantially oriented chain molecules and converting predetermined portions of said sheet to light-polarizing areas by dyeing said portions with a dye which renders said areas dichroic, said areas forming in said sheet a predetermined image, the optical density of each of said areas being a function of the vibration direction of light incident thereon.

3. The process comprising forming a sheet of a transparent plastic having long, substantially oriented chain molecules and converting predetermined portions of said sheet to light-polarizing areas by staining said portions with a stain comprising iodine, said areas forming in said sheet a predetermined image, the optical density of each of said areas being a function of the vibration direction of light incident thereon.

4. The process comprising forming a sheet of a transparent plastic having long, substantially oriented chain molecules and converting predetermined portions of said sheet to light-polarizing areas by staining said portions with a stain comprising a polyiodide, said areas forming in said sheet a predetermined image, the optical density of each of said areas being a function of the vibration direction of light incident thereon.

5. The process comprising forming a sheet of a transparent plastic having long, substantially oriented chain molecules and converting predetermined portions of said sheet to dichroic light-polarizing areas, said areas forming in said sheet a predetermined image, the optical density of each of said areas being a function of the vibration direction of light incident thereon and being a minimum when the said direction of vibration is perpendicular to the direction of orientation of said molecules.

6. A sheet of a transparent plastc having substantially oriented long, chain molecules, predetermined portions only of said sheet being dyed with a dye which renders said portions dichroic, said portions forming, in polarized light, an image, the optical density of which is a function of the direction of vibration of said polarized light.

7. A sheet of a transparent plastic having substantially oriented long, chain molecules, predetermined portions only of said sheet being stained with a polyiodide, said portions forming, in polarized light, an image, the optical density of which is a function of the direction of vibration of said polarized light.

8. The process comprising forming a sheet of a transparent plastic having long chain molecules, predeterminedly orienting the molecules in said sheet, and staining predetermined areas on said sheet with a dichroic stain, said areas forming in combination a predetermined image.

9. The process comprising forming a sheet of polyvinyl alcohol, predeterminedly orienting the molecules in said sheet, and incorporating predetermined varying amounts of a dichroic stain in predetermined areas on said sheet, said areas forming in combination a predetermined image.

10. The process comprising forming a sheet of a transparent plastic having long chain molecules, predeterminedly orienting the molecules in said sheet, and staining predetermined areas on said sheet with a polyiodide, said areas forming in combination a predetermined image.

11. The process comprising predeterminedly orienting the molecules in a sheet of transparent polyvinyl alcohol, and staining predetermined areas on said sheet with a dichroic stain, said areas forming in combination a predetermined image.

12. The process comprising heating a sheet of polyvinyl alcohol the molecules of which have been predeterminedly oriented, and staining predetermined areas on said sheet with a dichroic stain, said areas forming in combination a predetermined image.

13. As a new product, a sheet of a transparent plastic having oriented long chain molecules, predetermined areas on said sheet being stained with a dichroic stain, said areas forming in combination a predetermined image.

14. As a new product, a sheet of molecularly oriented polyvinyl alcohol, predetermined areas on said sheet being stained with a dichroic stain, said areas forming in combination a predetermined image.

15. As a new product, a sheet of molecularly oriented polyvinyl acetal, predetermined areas on said sheet being stained with a dichroic stain, said areas forming in combination a predetermined image.

16. As a new product, a sheet of molecularly oriented regenerated cellulose, predetermined areas on said sheet being stained with a dichroic stain, said areas forming in combination a predetermined image.

17. As a new product, a sheet of a transparent plastic having oriented straight chain molecules, predetermined areas of said sheet having varying amounts of a dichroic stain incorporated therein, said areas forming in combination a predetermined image.

18. As a new product, a sheet of molecularly oriented polyvinyl alcohol, predetermined areas of said sheet having varying amounts of a dichroic stain incorporated therein, said areas forming in combination a predetermined image.

19. As a new product, a sheet of molecularly oriented polyvinyl alcohol, predetermined areas on said sheet being stained to a predetermined varying amount with a polyiodide, said areas forming in combination a predetermined image.

EDWIN H. LAND.